(12) United States Patent
Kobayashi et al.

(10) Patent No.: US 11,690,314 B2
(45) Date of Patent: Jul. 4, 2023

(54) MOWER

(71) Applicant: Kubota Corporation, Osaka (JP)

(72) Inventors: Terumasa Kobayashi, Sakai (JP); Seiya Sato, Sakai (JP); Ryusuke Kawamoto, Sakai (JP)

(73) Assignee: Kubota Corporation, Osaka (JP)

( * ) Notice: Subject to any disclaimer, the term of this patent is extended or adjusted under 35 U.S.C. 154(b) by 511 days.

(21) Appl. No.: 16/896,473

(22) Filed: Jun. 9, 2020

(65) Prior Publication Data
US 2021/0137001 A1   May 13, 2021

(30) Foreign Application Priority Data
Nov. 12, 2019   (JP) .............................. JP2019-204875

(51) Int. Cl.
| | | |
|---|---|---|
| A01D 34/00 | (2006.01) | |
| A01D 34/64 | (2006.01) | |
| B66F 7/24 | (2006.01) | |
| A01D 34/81 | (2006.01) | |
| A01D 67/00 | (2006.01) | |
| A01D 101/00 | (2006.01) | |

(52) U.S. Cl.
CPC ........... *A01D 34/001* (2013.01); *A01D 34/64* (2013.01); *A01D 34/81* (2013.01); *B66F 7/243* (2013.01); *A01D 67/005* (2013.01); *A01D 2101/00* (2013.01)

(58) Field of Classification Search
CPC ...... A01D 34/001; A01D 34/64; A01D 34/81; A01D 34/661; A01D 67/005; B66F 7/243
See application file for complete search history.

(56) References Cited

U.S. PATENT DOCUMENTS

| | | | | |
|---|---|---|---|---|
| 7,685,800 B2 * | 3/2010 | Sugio | ..................... | A01D 34/64 56/320.1 |
| 9,699,962 B2 * | 7/2017 | Akita | ..................... | A01D 34/81 |
| 11,178,816 B2 * | 11/2021 | Anderson | .............. | A01D 34/81 |
| 2007/0028577 A1 * | 2/2007 | Clement | ................ | A01D 34/64 56/17.2 |
| 2008/0236125 A1 * | 10/2008 | Sugio | ..................... | A01D 34/81 56/14.7 |
| 2016/0183454 A1 * | 6/2016 | Akita | ..................... | A01D 34/81 56/320.1 |
| 2020/0267898 A1 * | 8/2020 | Anderson | ............... | B66F 7/243 |

FOREIGN PATENT DOCUMENTS

| | | | |
|---|---|---|---|
| JP | 5973402 B2 * | 8/2016 | |
| JP | 6162600 B2 | 7/2017 | |

* cited by examiner

*Primary Examiner* — Abigail A Risic
(74) *Attorney, Agent, or Firm* — The Webb Law Firm

(57) ABSTRACT

There are included a passage portion provided at an upper surface portion of a mower deck, front and back slope portions and provided at front and back portions of the passage portion, front and back supporting portions supporting the slope portions in such a manner that the slope portions are movable in the front-back direction and swingable in the up-down direction, and front and back linking portions that are supported in such a manner as to be swingable in the front-back direction about axes extending in the left-right direction and that are connected with the slope portions. Operating the front and back linking portions in the front-back direction causes the front and back slope portions to be operated to the storage and use positions.

8 Claims, 9 Drawing Sheets

MOWER

CROSS-REFERENCE TO RELATED APPLICATION

This application claims priority to Japanese Patent Application No. 2019-204875 filed Nov. 12, 2019, the disclosure of which is hereby incorporated by reference in its entirety.

TECHNICAL FIELD

The present invention relates to a mid-mount mower supported on a portion of a work vehicle such as a tractor which portion is between front wheels and the rear wheels.

BACKGROUND ART

In the case where a mid-mount mower is to be attached to a work vehicle, an operator moves the work vehicle forward, for example, over the mower on the ground so that the front wheels of the work vehicle move over the mower from the back side of the mower deck to its front side. This allows the mower on the ground to be positioned between the front wheels and the rear wheels of the work vehicle, and allows the mower to be attached to the work vehicle.

In the case where a mower attached to a work vehicle is to be detached therefrom, an operator detaches the mower from the work vehicle, places the mower on the ground, and moves the work vehicle forward, for example, so that the rear wheels of the work vehicle move over the mower from the back side of the mower deck to its front side.

In this case, as disclosed in Patent Literature 1, a mower includes a passage portion provided at each of a right portion and a left portion of an upper surface portion of a mower deck and oriented in the front-back direction. Further, at a front portion and a back portion of each passage portion, front and back slope portions are provided.

With this configuration, a wheel of a work vehicle passes from the back slope portion to the passage portion and to the front slope portion or in a reverse manner from the front slope portion to the passage portion and to the back slope portion, so that the wheel of the work vehicle can move over the mower deck with ease.

CITATION LIST

Patent Literature

Patent Literature 1: Japanese Patent No. 6162600

SUMMARY OF INVENTION

Technical Problem

Patent Literature 1 discloses that the passage portion has an elongate hole which is open in the front-back direction, that a pin provided at each slope portion is inserted in the elongate hole of the passage portion, and that the slope portion is supported by the passage portion in such a manner as to be moveable in the front-back direction and swingable in the up-down direction.

With this configuration, an operator can operate the slope to a storage position provided at the passage portion and to a use position at which the slope extends from a front portion (back portion) of the passage portion obliquely in a lower front direction (lower back direction) to be in contact with the ground.

It is an object of the present invention to configure a mower including a passage portion and a slope portion such that the slope portion is operable to a storage position and a use position smoothly.

Solution to Problem

A mower of one or more embodiments of the present invention comprises: a passage portion provided at each of a right portion and a left portion of an upper surface portion of a mower deck and oriented in a front-back direction on which passage portion a wheel of a work vehicle passes; a front slope portion provided at a front portion of the passage portion; a back slope portion provided at a back portion of the passage portion; a front supporting portion supporting the front slope portion in such a manner as to allow the front slope portion to move in the front-back direction and swing in an up-down direction; a back supporting portion supporting the back slope portion in such a manner as to allow the back slope portion to move in the front-back direction and swing in the up-down direction; a front linking portion that is supported in such a manner as to swing in the front-back direction about an axis extending in a left-right direction and that is connected with the front slope portion; and a back linking portion that is supported in such a manner as to swing in the front-back direction about an axis extending in the left-right direction and that is connected with the back slope portion, wherein as a result of the front linking portion being operated in the front-back direction, the front slope portion is operated, due to the front linking portion and the front supporting portion, to a front storage position provided at the passage portion and to a front use position at which the front slope portion extends from the front portion of the passage portion obliquely in a lower front direction such that a front portion of the front slope portion is capable of coming into contact with ground, and as a result of the back linking portion being operated in the front-back direction, the back slope portion is operated, due to the back linking portion and the back supporting portion, to a back storage position provided at the passage portion and to a back use position at which the back slope portion extends from the back portion of the passage portion obliquely in a lower back direction such that a back portion of the back slope portion is capable of coming into contact with the ground.

The present invention is arranged such that the front slope portion is guided by the front supporting portion between the front storage position provided at the passage portion and the front use position at which the front slope portion extends from a front portion of the passage portion obliquely in a lower front direction such that a front portion of the front slope portion is capable of coming into contact with the ground and additionally that the front linking portion supported in such a manner as to be swingable in the front-back direction about an axis extending in the left-right direction is connected with the front slope portion.

As a result of this, in the case where the front slope portion is moved by the front supporting portion between the storage position and the use position, the front slope portion is guided to the storage position and to the use position also by the swing of the front linking portion connected with the front slope portion. Thus, the front slope portion is movable between the storage position and the use position smoothly.

The present invention is arranged such that similarly to the front slope portion, the back slope portion is guided by the back supporting portion between the back storage position provided at the passage portion and the back use position at which the back slope portion extends from a back portion of the passage portion obliquely in a lower back direction such that a back portion of the back slope portion is capable of coming into contact with the ground and additionally that the back linking portion supported in such a manner as to be swingable in the front-back direction about an axis extending in the left-right direction is connected with the back slope portion. As a result of this, the back slope portion is movable between the storage position and the use position smoothly.

The present invention may preferably be arranged such that the front linking portion is connected with a back portion of the front slope portion, in a state where the front slope portion is at the front storage position, the front linking portion is positioned backwardly relative to the axis of the front linking portion, in a state where the front slope portion is at the front use position, the front linking portion is positioned forwardly relative to the axis of the front linking portion, and the front linking portion swings above and past the axis of the front linking portion, and the back linking portion is connected with a front portion of the back slope portion, in a state where the back slope portion is at the back storage position, the back linking portion is positioned forwardly relative to the axis of the back linking portion, in a state where the back slope portion is at the back use position, the back linking portion is positioned backwardly relative to the axis of the back linking portion, and the back linking portion swings above and past the axis of the back linking portion.

In the case where a mower attached to a work vehicle is to be detached therefrom, after an operator detaches the mower from the work vehicle and places the mower on the ground, the operator operates a front slope portion from a storage position to a use position, and operates a back slope portion from a storage position to a use position.

Since the front wheels of the work vehicle are positioned on the front side of the mower, and the rear wheels of the work vehicle are positioned on the back side of the mower, in the case of, for example, a work vehicle with a short wheelbase, if the front slope portion is configured to be moved from the storage position horizontally to the front side and then swung downwardly, the front slope portion may come into contact with a front wheel of the work vehicle and fail to be operated to the use position appropriately.

Similarly, if the back slope portion is configured to be moved from the storage position horizontally to the back side and then swung downwardly, the back slope portion may come into contact with a rear wheel of the work vehicle and fail to be operated to the use position smoothly.

With the present invention, the front linking portion is connected with a back portion of the front slope portion and is swung between positions on the back and front sides of the axis of the front linking portion above and past the axis of the front linking portion.

As a result of this, in the case where the front slope portion is to be moved to the use position in the state where the front slope portion is at the storage position, and the front linking portion is positioned backwardly relative to the axis of the front linking portion, the front linking portion is swung on an upper front side from the state where the front linking portion is positioned backwardly relative to the axis of the front linking portion, so that the front linking portion stands.

Along with this, a back portion of the front slope portion is lifted by the front linking portion while the front slope portion is being supported by the front supporting portion, so that the front slope portion becomes inclined with a back portion lifted.

Next, as the front linking portion is swung to a position on the front side of the axis of the front linking portion, the front slope portion is moved obliquely in a lower front direction as supported by the front supporting portion while substantially maintaining its inclined posture with a back portion lifted, so that the front slope portion reaches the use position.

With the present invention, when the front slope portion is to be moved from the storage position to the use position, the front slope portion is moved from the storage position not horizontally on the front side but obliquely in a lower front direction while substantially maintaining its inclined posture with a back portion lifted. Thus, there is only a low possibility that the front slope portion comes into contact with a front wheel of the work vehicle.

With the present invention, similarly to the case of the front slope portion, the back linking portion is connected with a front portion of the back slope portion and is swung between positions on the front and back sides of the axis of the back linking portion above and past the axis of the back linking portion.

As a result of this, when the back slope portion is to be moved from the storage position to the use position, the back slope portion is moved from the storage position not horizontally on the back side but obliquely in a lower back direction while substantially maintaining its inclined posture with a front portion lifted. Thus, there is only a low possibility that the back slope portion comes into contact with a rear wheel of the work vehicle.

The present invention may preferably be arranged such that the front supporting portion includes a front elongate hole portion present in the front slope portion in the front-back direction and a front shaft portion present through the front elongate hole portion in the left-right direction and attached to the front portion of the passage portion, and the back supporting portion includes a back elongate hole portion present in the back slope portion in the front-back direction and a back shaft portion present through the back elongate hole portion in the left-right direction and attached to the back portion of the passage portion.

With the present invention, an elongate hole portion present in the slope portion in the front-back direction and a shaft portion attached to the passage portion are provided at the supporting portion. As a result, the passage portion is not longer than necessary in the front-back direction. Thus, there is an advantage in terms of making the whole compact.

The present invention may preferably be arranged such that the back shaft portion is supported by a support linking portion configured to swing in the up-down direction about an axis extending in the left-right direction, and in the state where the back slope portion is at the back storage position, operating the back linking portion backwardly causes the support linking portion to swing downwardly and the back shaft portion to move downwardly.

For work vehicles such as a tractor, rear wheels are typically larger in diameter than front wheels in many cases. Thus, in a state where a mower is attached to a work vehicle, the distance between a back portion of the mower and the rear wheels is smaller than the distance between a front portion of the mower and the front wheels in many cases.

In the above-described state, in the case where the back slope portion is to be operated from the storage position to the use position, if the back slope portion is configured to be moved from the storage position horizontally to the back side and then swung downwardly, there is a high possibility that the back slope portion comes into contact with a rear wheel of the work vehicle and fails to be operated to the use position smoothly.

The present invention is arranged such that when the back slope portion is to be moved from the storage position to the use position, the back slope portion is moved obliquely in a lower back direction while substantially maintaining its inclined posture with a front portion lifted due to the back supporting portion and the back linking portion and additionally that the support linking portion is swung downwardly, and the shaft portion of the back supporting portion is moved downwardly.

As a result of this, the back slope portion can obtain a state where the back slope portion becomes inclined with a front portion lifted while being lowered and is then moved obliquely in a lower back direction while substantially maintaining its inclined posture with a front portion lifted, and when the back slope portion is to be moved from the storage position to the use position, there is a low possibility that the back slope portion comes into contact with a rear wheel of the work vehicle.

The present invention may preferably further comprise: a front operating portion connected with the front linking portion for manual operation of the front linking portion; and a back operating portion connected with the back linking portion for manual operation of the back linking portion.

With the present invention, an operator can operate the linking portion by holding the operating portion, and can move the slope portion to the storage position and the use position via the linking portion with ease.

The present invention may preferably be arranged such that a front holding portion configured to hold the front operating portion in a state where the front slope portion is at the front storage position; and a back holding portion configured to hold the back operating portion in a state where the back slope portion is at the back storage position.

With the present invention, by holding the operating portion with use of the holding portion in a state where the slope has been operated to the storage position with use of the operating portion, there is a low possibility that the slope portion is moved from the storage position toward the use position due to vibration or the like during operation.

The present invention may preferably be arranged such that the passage portion includes a right side plate and a left side plate that are oriented in the front-back direction, the front linking portion and the back linking portion are positioned between the right side plate and the left side plate in a plan view, and the front linking portion and the back linking portion are positioned between the right side plate and the left side plate in the plan view in a state where the front slope portion is at the front storage position, and the back slope portion is at the back storage position.

In the case where a mower is to be attached to a work vehicle or the case where a mower attached to a work vehicle is to be detached therefrom, a wheel of the work vehicle moves on and past a passage portion, so the passage portion needs to be so strong as to support the weight of the work vehicle.

With the present invention, right and left side plates oriented in the front-back direction are provided at the passage portion. Thus, there is an advantage in terms of ensuring strength of the passage portion.

With the present invention, the linking portion is positioned between the right and left side plates in a plan view, and the slope portion is positioned between the right and left side plates in a plan view in a state where the slope portion is at the storage position. Thus, there is an advantage in terms of making the passage portion (right and left side plates), the linking portion, and the slope portion compact.

The present invention may preferably be arranged such that the front supporting portion, the back supporting portion, the front linking portion, and the back linking portion are provided at the passage portion, and the mower further comprises an attaching portion configured to attach the passage portion to and detach the passage portion from the mower deck.

With the present invention, the passage portion is provided with the slope portion, and additionally, the passage portion is provided with the supporting portion and the linking portion. As the passage portion, the slope portion, the supporting portion, and the linking portion are together attached to and detached from the mower deck, there is an advantage in terms of working efficiency.

DESCRIPTION OF EMBODIMENTS

FIGS. 1 to 11 illustrate a mid-mount mower. In FIGS. 1 to 11, "F" indicates the forward direction, "B" indicates the backward direction, "U" indicates the upward direction, "D" indicates the downward direction, "R" indicates the rightward direction, and "L" indicates the leftward direction.

(Overall Configuration of Mower)

Figure 1:
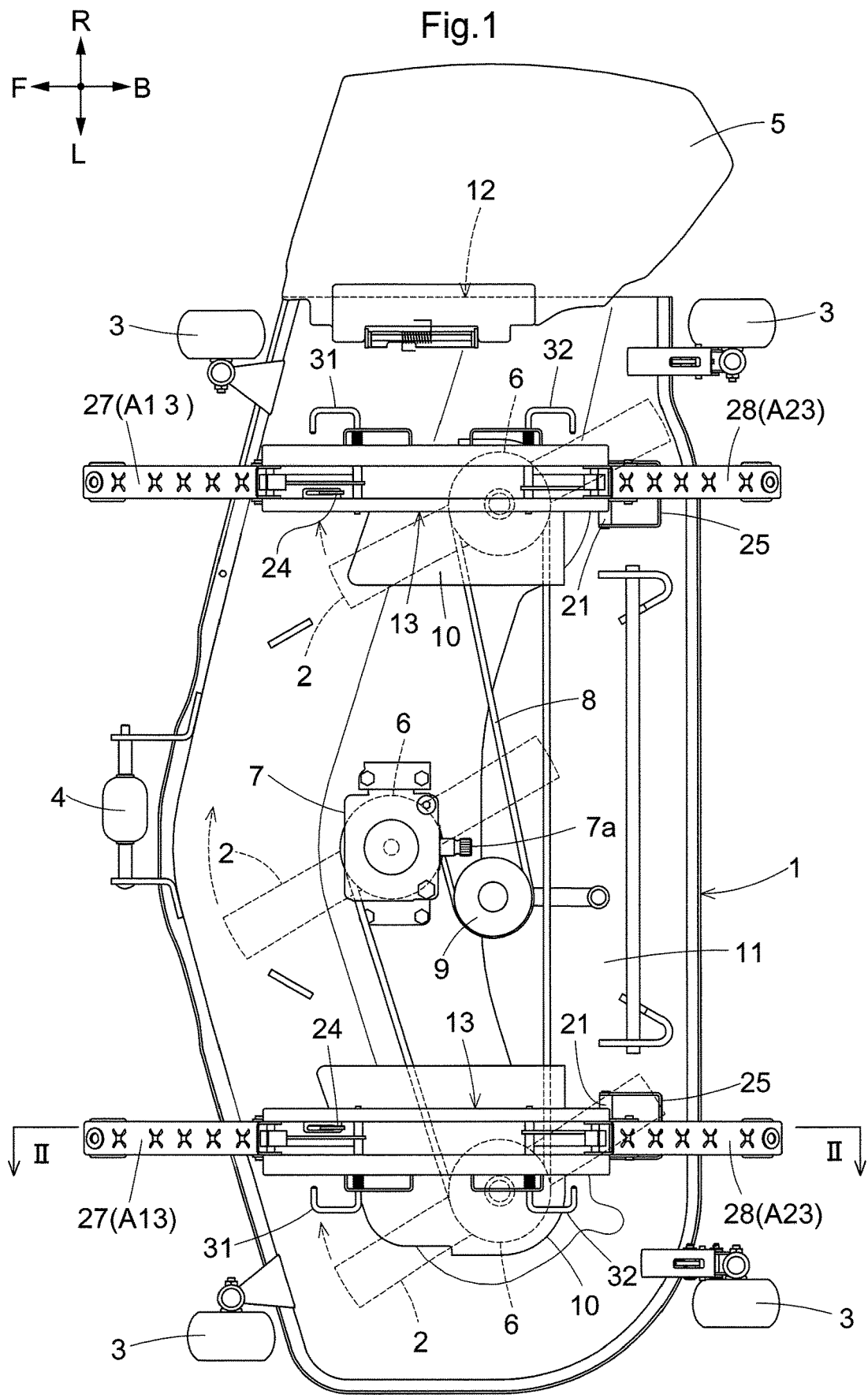
FIG. 1 is a plan view of a mower.

As illustrated in FIG. 1, the mower is configured such that members such as cutting blades 2, ground wheels 3, a roller 4, and a discharge guide 5 are attached to a mower deck 1.

The three cutting blades 2 are each supported by a lower surface portion of the mower deck 1 in such a manner as to be rotatable about a vertical axis. A cutting-blade shaft (not shown in the drawings) connected with each cutting blade 2 protrudes above from an upper surface portion 11 of the mower deck 1. To an upper portion of each cutting-blade shaft, a driving pulley 6 is attached.

Above the central driving pulley 6, an input case 7 is provided. Covers 10 covering the right and left driving pulleys 6 are provided at the upper surface portion 11 of the mower deck 1. Around the three driving pulleys 6, a driving belt 8 is attached. For the driving belt 8, a tension pulley 9 is provided.

In a state where the mower is attached to a work vehicle such as a tractor, power of the work vehicle is transmitted via a transmission shaft (not shown in the drawings) to an input shaft 7a of the input case 7, and the power transmitted to the input case 7 drives the central cutting blade 2 to rotate clockwise in FIG. 1. The power transmitted to the input case 7 is transmitted from the central driving pulley 6 via the driving belt 8 to the right and left driving pulleys 6, driving the right and left cutting blades 2 to rotate clockwise in FIG. 1.

Grass cut with the cutting blades 2 is carried from a front portion of the inside of the mower deck 1 to the right side, and is discharged from a discharge port 12 at a right portion of the mower deck 1 to the right side while being guided by the discharge guide 5.

The four ground wheels 3 are supported at a front portion and back portion of the right portion of the mower deck 1 and at a front portion and back portion of a left portion of the mower deck 1. With the ground wheels 3 grounded, the mower is supported by the ground.

The roller 4 is supported at a central portion of a front portion of the mower deck 1 which central portion is at the center in the left-right direction. In the case where the ground has a bump in a state where a work vehicle to which the mower is attached travels forward for the mower to carry out a cutting operation, the roller 4 rides over the bump of the ground and lifts the mower deck 1 to prevent the cutting blades 2 from coming into contact with the bump of the ground.

(Configuration of Passage Portions)

Figure 2:
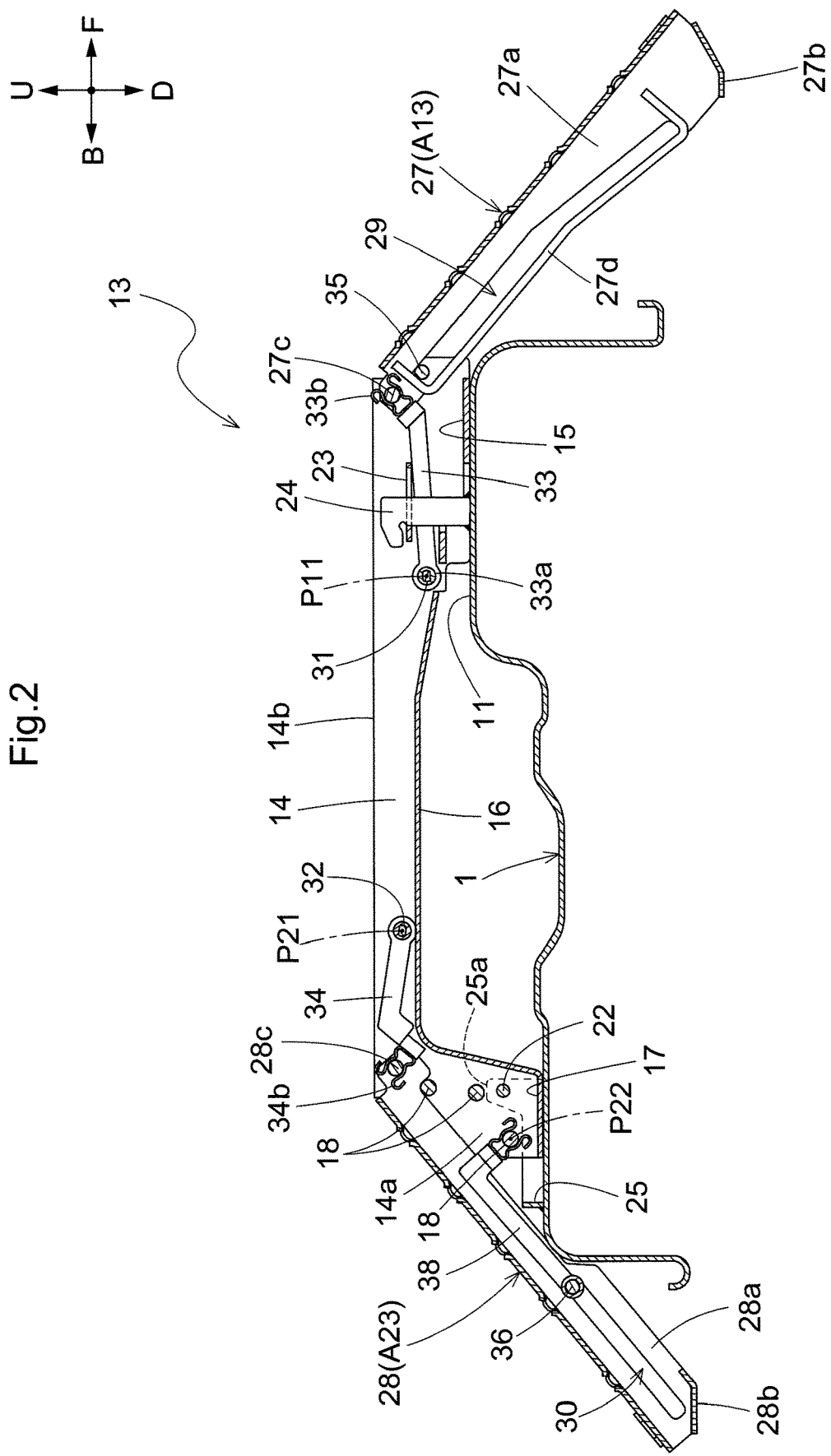
FIG. 2 is a cross-sectional view taken along line II-II in FIG. 1 in a state where front and back slope portions have been operated to front and back use positions.

As illustrated in FIGS. 1 and 2, right and left passage portions 13 are provided at a right portion and left portion of the upper surface portion 11 of the mower deck 1 in the front-back direction astride the driving pulleys 6 and the covers 10. The right and left passage portions 13 are identical to each other in configuration, and are shaped in left-right symmetry with each other. The description below deals with the left passage portion 13.

As illustrated in FIGS. 2 to 5, right and left side plates 14 are provided in the passage portion 13 in the front-back direction. At a lower end portion of a front portion of the passage portion 13, a bottom plate 15 is connected across the right and left side plates 14. At a lower end portion of an intermediate portion of the passage portion 13 in the front-back direction, a bottom plate 16 is connected across the right and left side plates 14.

Extending portions 14a extend downward from back portions of the right and left side plates 14. A bottom plate 17 is connected across lower end portions of the extending portions 14a of the right and left side plates 14. Upper side portions 14b of the right and left side plates 14 are bent outwardly.

Three reinforcing members 18 each in the shape of a round bar are connected across the extending portions 14a of the right and left side plates 14. A front holding portion 19 and a back holding portion 20 each in the shape of a channel in a plan view are connected with an outer surface portion of the left side plate 14.

As described above, the passage portion 13 is in the shape of an upwardly open channel with the right and left side plates 14 and the bottom plates 15, 16, and 17.

(Arrangement for attachment and Detachment Of Passage Portions to and from Mower Deck)

As illustrated in FIGS. 1 to 5, for the right passage portion 13, a boss portion 21 is connected with an outer surface portion of the extending portion 14a of the left side plate 14, and for the left passage portion 13, a boss portion 21 is connected with an outer surface portion of the extending portion 14a of the right side plate 14.

An attaching pin 22 (corresponding to the "attaching portion") is provided in such a manner as to be capable of becoming inserted through and pulled out of the extending portion 14a and the boss portion 21 of each of the right and left side plates 14. An attaching plate 23 (corresponding to the "attaching portion") having an elongate hole that is open in the front-back direction is connected with an inner surface portion of a front portion of the right (left) side plate 14.

With each of a right portion and left portion of a front portion at the upper surface portion 11 of the mower deck 1, a hook-shaped engaging portion 24 (corresponding to the "attaching portion") is connected. With each of a right portion and left portion of a back portion at the upper surface portion 11 of the mower deck 1, a connecting portion 25 (corresponding to the "attaching portion") in the shape of a channel in a plan view is connected. The connecting portion 25 includes right and left protruding portions 25a.

In the case where the passage portion 13 is to be attached to the mower deck 1, first, while the bottom plate 15 of the passage portion 13 is placed on a front portion of the upper surface portion 11 of the mower deck 1, the engaging portion 24 is placed between the right and left side plates 14 of the passage portion 13 and inserted into the elongate hole of the attaching plate 23 of the passage portion 13 so that the engaging portion 24 is caused to engage with the attaching plate 23 of the passage portion 13.

Along with the above-described operation, while the bottom plate 17 of the passage portion 13 is inserted into the connecting portion 25, the bottom plate 17 is placed at a back portion of the upper surface portion 11 of the mower deck 1. As a result of this, the boss portion 21 of the passage portion 13 is positioned at the protruding portions 25a of the connecting portion 25. Thus, the attaching pin 22 is inserted through the right and left protruding portions 25a of the connecting portion 25 and the extending portions 14a of the right and left side plates 14 of the passage portion 13, and the boss portion 21. A retaining pin 26 is attached to the attaching pin 22.

As described above, the engagement between the engaging portion 24 and the attaching plate 23, and the attaching pin 22 cause the passage portion 13 to be attached to the mower deck 1. Removing the retaining pin 26 from the attaching pin 22, pulling the attaching pin 22 out of the passage portion 13, and detaching the attaching plate 23 from the engaging portion 24 allow the passage portion 13 to be detached from the mower deck 1.

(Configuration of Front and Back Slope Portions)

As illustrated in FIGS. 2 to 5, a front slope portion 27 is provided at a front portion of each of the right and left passage portions 13, and a back slope portion 28 is provided at a back portion of each of the right and left passage portions 13.

The right and left front slope portions 27 are identical to each other in configuration, and are shaped in left-right symmetry with each other. The right and left back slope portions 28 are identical to each other in configuration, and are shaped in left-right symmetry with each other. The description below deals with the left front slope portion 27 and the left back slope portion 28.

The front slope portion 27 is a plate member bent in the shape of a channel. At a front portion of the front slope portion 27, a ground plate 27b is connected across right and left vertical surface portions 27a of the front slope portion 27. At a back portion of the front slope portion 27, a pin 27c is connected across the right and left vertical surface portions 27a of the front slope portion 27.

With a lower portion of the left vertical surface portion 27a of the front slope portion 27, a round-bar member 27d is connected. The left vertical surface portion 27a and the round-bar member 27d of the front slope portion 27 define an elongate hole portion 29 (corresponding to the "front supporting portion") in the front-back direction of the front slope portion 27.

The back slope portion 28 is a plate member bent in the shape of a channel. At a back portion of the back slope portion 28, a ground plate 28b is connected across right and left vertical surface portions 28a of the back slope portion 28. At a front portion of the back slope portion 28, a pin 28c is connected across the right and left vertical surface portions 28a of the back slope portion 28.

At a back portion of each of the right and left vertical surface portions 28a of the back slope portion 28, an elongate hole portion 30 (corresponding to the "back supporting portion") is open in the front-back direction of the back slope portion 28.

(Arrangement for Support of Front Slope Portion at Passage Portion)

As illustrated in FIGS. 2 to 5, a front operating portion 31 that is bent at an angle in a plan view is inserted through the right and left side plates 14 and the front holding portion 19 of the passage portion 13, and is supported in such a manner as to be swingable about an axis P11 extending in the left-right direction and to be slidable along the axis P11.

The passage portion 13 is provided with a front linking portion 33. With a base portion of the front linking portion 33, a boss portion 33a is connected. At an end portion of the front linking portion 33, a shaft supporting portion 33b is provided. In the passage portion 13, the boss portion 33a of the front linking portion 33 is placed between the right and left side plates 14, and the front operating portion 31 is inserted into the boss portion 33a of the front linking portion 33.

An inner surface of the boss portion 33a of the front linking portion 33 and an outer surface of the front operating portion 31 are shaped to have diameters different from each other. The front operating portion 31 and the front linking portion 33 (boss portion 33a) are integrally swingable about the axis P11. The front operating portion 31 is slidable along the axis P11 relative to the boss portion 33a of the front linking portion 33.

In the passage portion 13, a shaft portion 35 (corresponding to the "supporting portion") in the left-right direction is attached to a front portion of each of the right and left side plates 14, and is inserted in the left-right direction through the elongate hole portion 29 of the front slope portion 27. To the shaft supporting portion 33b of the front linking portion 33, the pin 27c of the front slope portion 27 is attached swingably.

With the above configuration, the front linking portion 33 that is supported swingably in the front-back direction about the axis P11 extending in the left-right direction and that is connected with a back portion of the front slope portion 27 is provided at a front portion of the passage portion 13, and the front linking portion 33 is placed between the right and left side plates 14 in a plan view.

The front elongate hole portion 29 and the front shaft portion 35 allow the front slope portion 27 to be supported in such a manner as to be movable in the front-back direction and swingable in the up-down direction.

The front operating portion 31 is connected with the front linking portion 33 (boss portion 33a). In the case where an operator holds the front operating portion 31 and operates the front operating portion 31 about the axis P11, the front linking portion 33 is operated manually about the axis P11 in the front-back direction.

(Arrangement for Support of Back Slope Portion at Passage Portion)

As illustrated in FIGS. 2 to 5, a back operating portion 32 that is bent at an angle in a plan view is inserted through the right and left side plates 14 and the back holding portion 20 of the passage portion 13, and is supported in such a manner as to be swingable about an axis P21 extending in the left-right direction and to be slidable along the axis P21.

The passage portion 13 is provided with a back linking portion 34. With a base portion of the back linking portion 34, a boss portion 34a is connected. At an end portion of the back linking portion 34, a shaft supporting portion 34b is provided. In the passage portion 13, the boss portion 34a of the back linking portion 34 is placed between the right and left side plates 14, and the back operating portion 32 is inserted into the boss portion 34a of the back linking portion 34.

An inner surface of the boss portion 34a of the back linking portion 34 and an outer surface of the back operating portion 32 are shaped to have diameters different from each other. The back operating portion 32 and the back linking portion 34 (boss portion 34a) are integrally swingable about the axis P21. The back operating portion 32 is slidable along the axis P21 relative to the boss portion 34a of the back linking portion 34.

In the passage portion 13, a support linking portion 38 is supported by the lowermost reinforcing member 18 in such a manner as to be vertically swingable about an axis P22 extending in the left-right direction. A back shaft portion 36 (corresponding to the "back supporting portion") is supported at an end portion of the support linking portion 38 in the left-right direction.

The shaft portion 36 is inserted in the left-right direction through the elongate hole portions 30 of the back slope portion 28. To the shaft supporting portion 34b of the back linking portion 34, the pin 28c of the back slope portion 28 is attached swingably.

With the above configuration, the back linking portion 34 that is supported swingably in the front-back direction about the axis P21 extending in the left-right direction and that is connected with a front portion of the back slope portion 28 is provided at a back portion of the passage portion 13, and the back linking portion 34 is placed between the right and left side plates 14 in a plan view.

The back elongate hole portion 30 and the back shaft portion 36 allow the back slope portion 28 to be supported in such a manner as to be movable in the front-back direction and swingable in the up-down direction.

The back operating portion 32 is connected with the back linking portion 34 (boss portion 34a). In the case where an operator holds the back operating portion 32 and operates the back operating portion 32 about the axis P21, the back linking portion 34 is operated manually about the axis P21 in the front-back direction.

(Movement of Front Slope Portion between Front Storage Position and Front Use Position)

Figure 6:
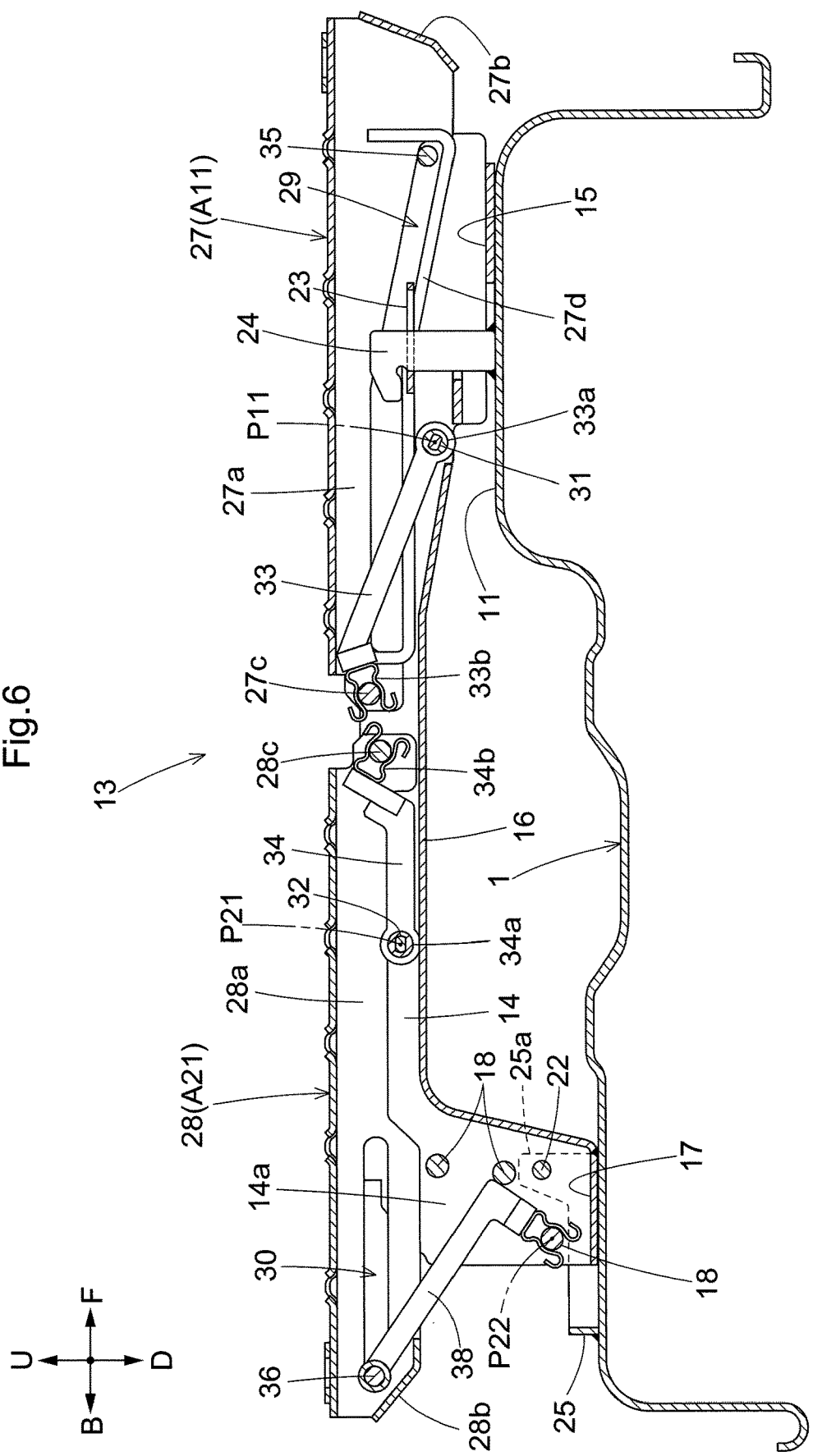
FIG. 6 is a cross-sectional view taken along line II-II in FIG. 1 in a state where front and back slope portions have been operated to front and back storage positions.
Figure 7:
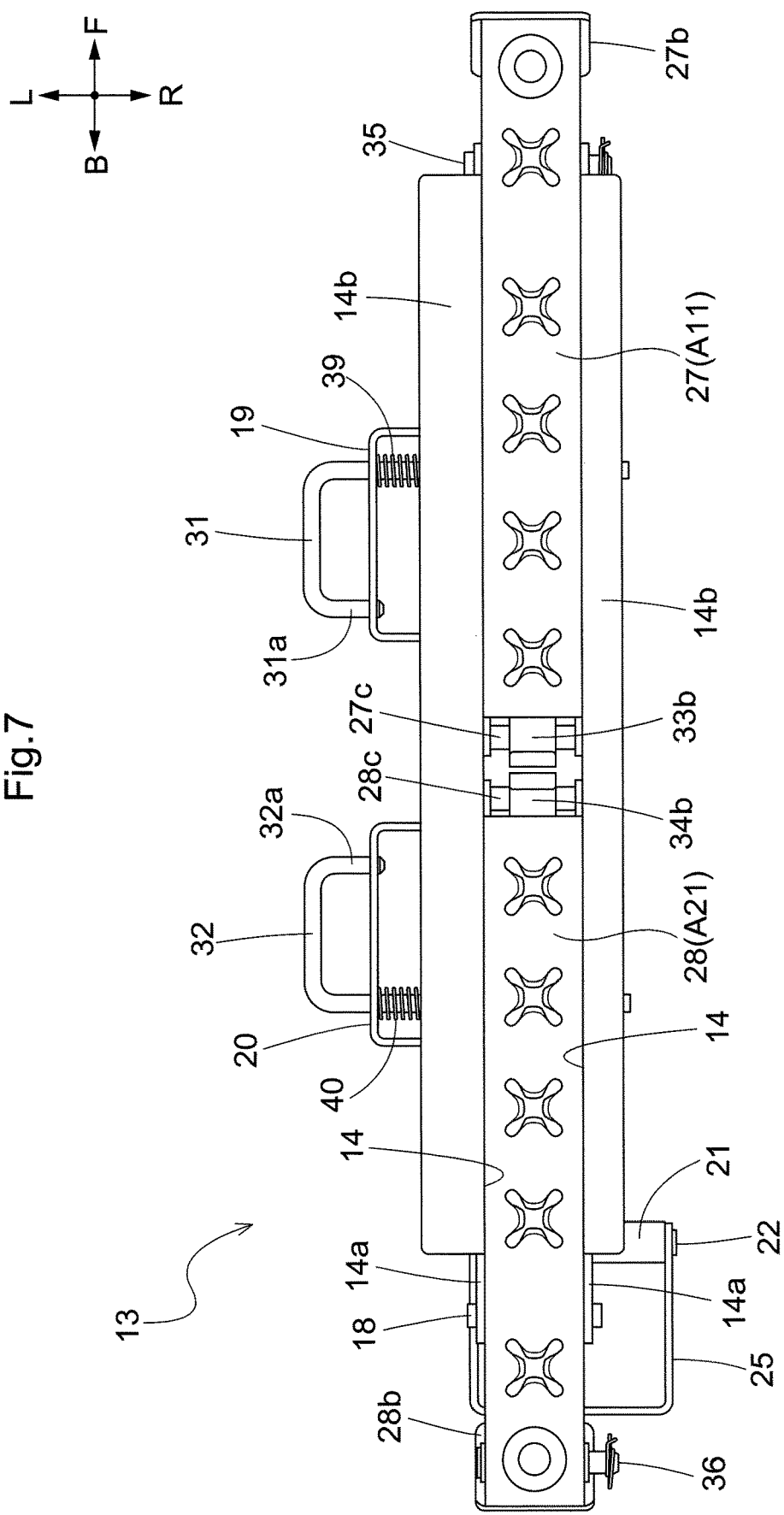
FIG. 7 is a plan view of members such as a passage portion and front and back slope portions in a state where the front and back slope portions have been operated to front and back storage positions.

FIGS. 6 and 7 illustrate a state where the front slope portion 27 is at a front storage position A11. In this state, the front slope portion 27 is positioned between the right and left side plates 14 in a plan view, the front linking portion 33 is positioned backwardly relative to the axis P11 of the front linking portion 33, and the front shaft portion 35 is positioned at a front end portion of the elongate hole portion 29 of the front slope portion 27.

In the state where the front slope portion 27 is at the front storage position A11, the front operating portion 31 is also positioned backwardly relative to the axis P11 of the front linking portion 33. Keeping an end portion 31a of the front operating portion 31 inserted in an engaging hole 19a (see FIGS. 4 and 5) of the front holding portion 19 causes the front operating portion 31 to be held in such a manner as to be incapable of swinging about the axis P11 and the front slope portion 27 to be held at the front storage position A11.

As illustrated in FIGS. 3, 4, 5, and 7, between the front operating portion 31 and the front holding portion 19, a spring 39 for urging the front operating portion 31 from the front holding portion 19 toward the left side plate 14 is provided. The spring 39 urges the end portion 31a of the front operating portion 31 toward the side from which the end portion 31a enters the engaging hole 19a of the front holding portion 19. The end portion 31a of the front operating portion 31 does not easily come out of the engaging hole 19a of the front holding portion 19.

When an operator holds the front operating portion 31 and pulls the end portion 31a of the front operating portion 31 out of the engaging hole 19a of the front holding portion 19 against the urge of the spring 39, the front operating portion 31 becomes operable.

Figure 8:
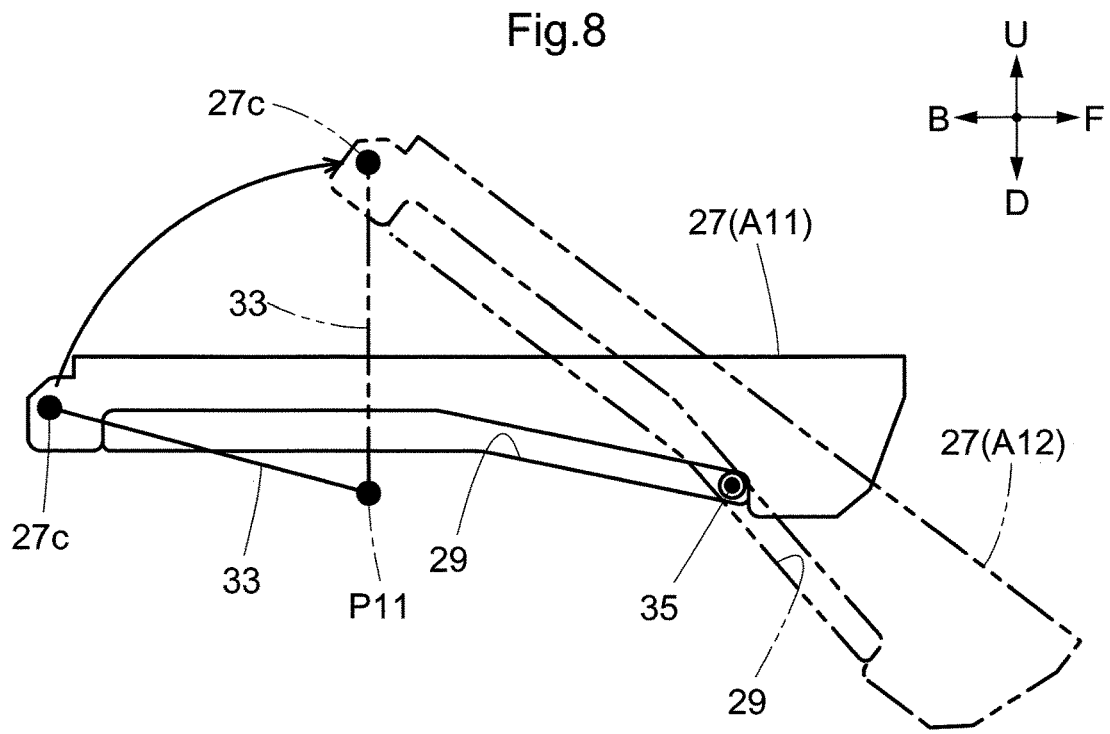
FIG. 8 is a schematic side view illustrating a state where a front slope portion is operated from a front storage position to an intermediate position.

As illustrated in FIG. 8, when the operator operates the front operating portion 31 from a back position to an upper front side relative to the axis P11, the front linking portion 33 is also swung from a back position to an upper front side relative to the axis P11.

Along with this, as a result of the front slope portion 27 being supported by the front elongate hole portion 29 and the front shaft portion 35, the front slope portion 27 is swung in such a manner that a back portion of the front slope portion 27 is lifted by the front linking portion 33 while the front slope portion 27 is moved a little to a front side. When the front linking portion 33 reaches a state where the front linking portion 33 stands from the axis P11, the front slope portion 27 reaches an intermediate position A12, at which the front slope portion 27 has an inclined posture with a back portion lifted.

Figure 9:
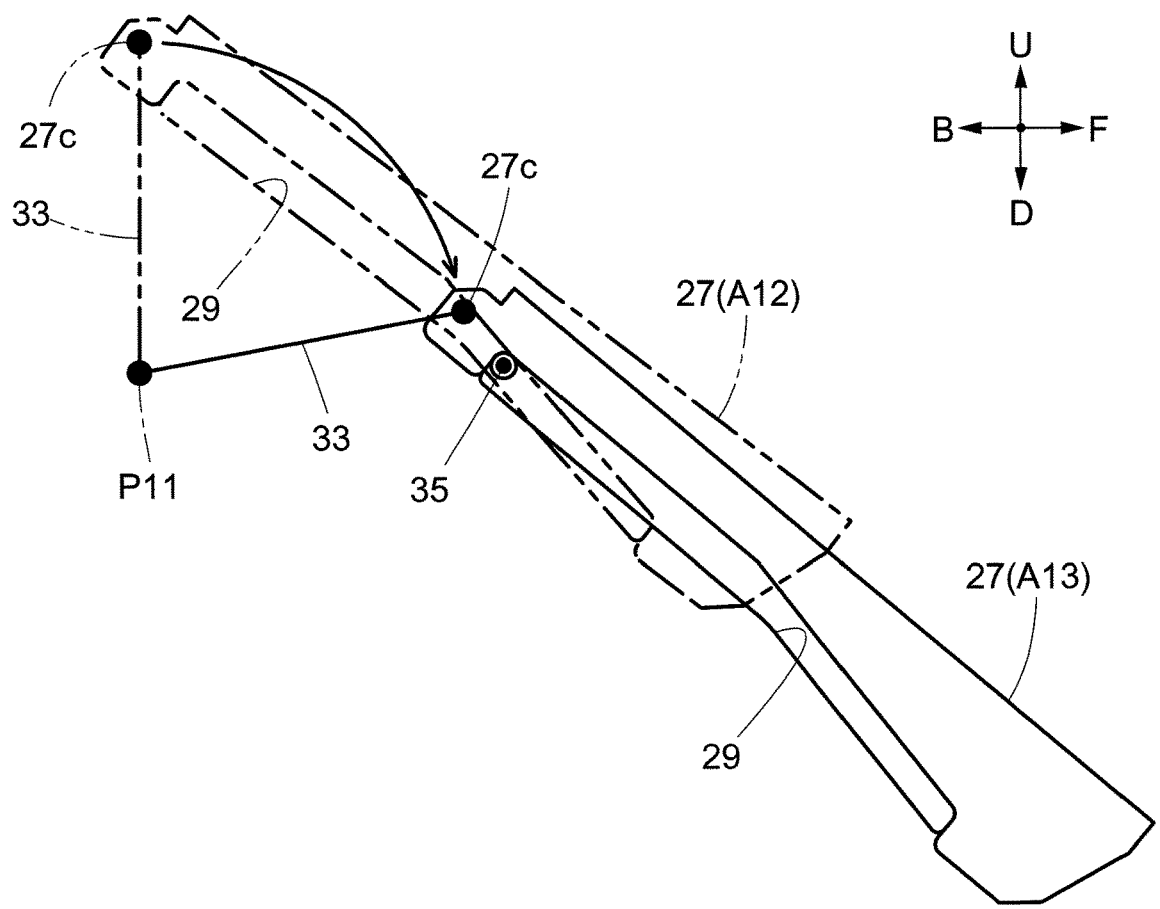
FIG. 9 is a schematic side view illustrating a state where a front slope portion is operated from an intermediate position to a front use position.

As illustrated in FIGS. 8 and 9, when the operator then operates the front operating portion 31 from the state where the front operating portion 31 stands from the axis P11 to a front position relative to the axis P11, the front linking portion 33 is also swung to a front position relative to the axis P11.

As the front linking portion 33 is swung from the state where the front linking portion 33 stands from the axis P11 to a front position relative to the axis P11, the front slope portion 27 is, as a result of being supported by the front elongate hole portion 29 and the front shaft portion 35, moved obliquely in a lower front direction and reaches a front use position A13 while substantially maintaining its inclined posture with a back portion lifted, and the front shaft portion 35 reaches a back end portion of the front elongate hole portion 29.

Figure 3:
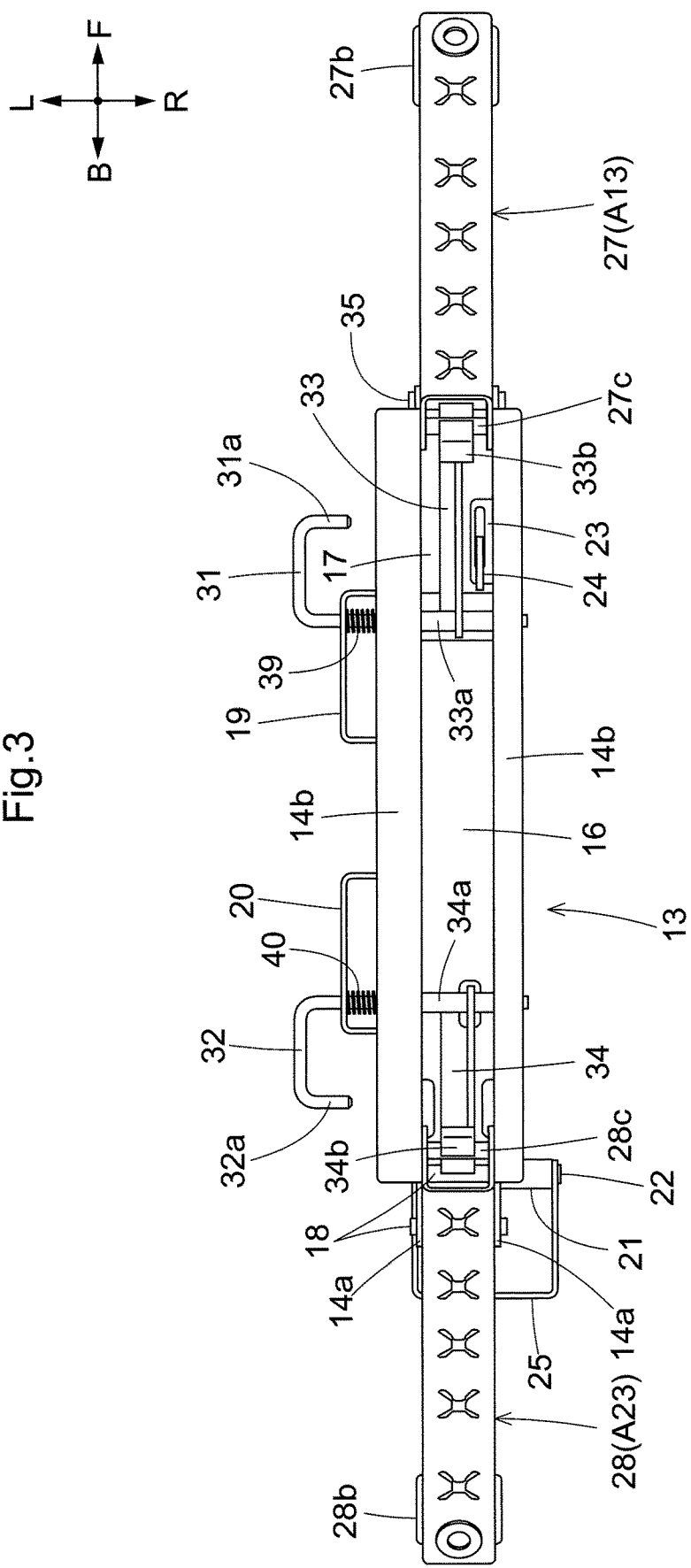
FIG. 3 is a plan view of members such as a passage portion and front and back slope portions in a state where the front and back slope portions have been operated to front and back use positions.
Figure 4:
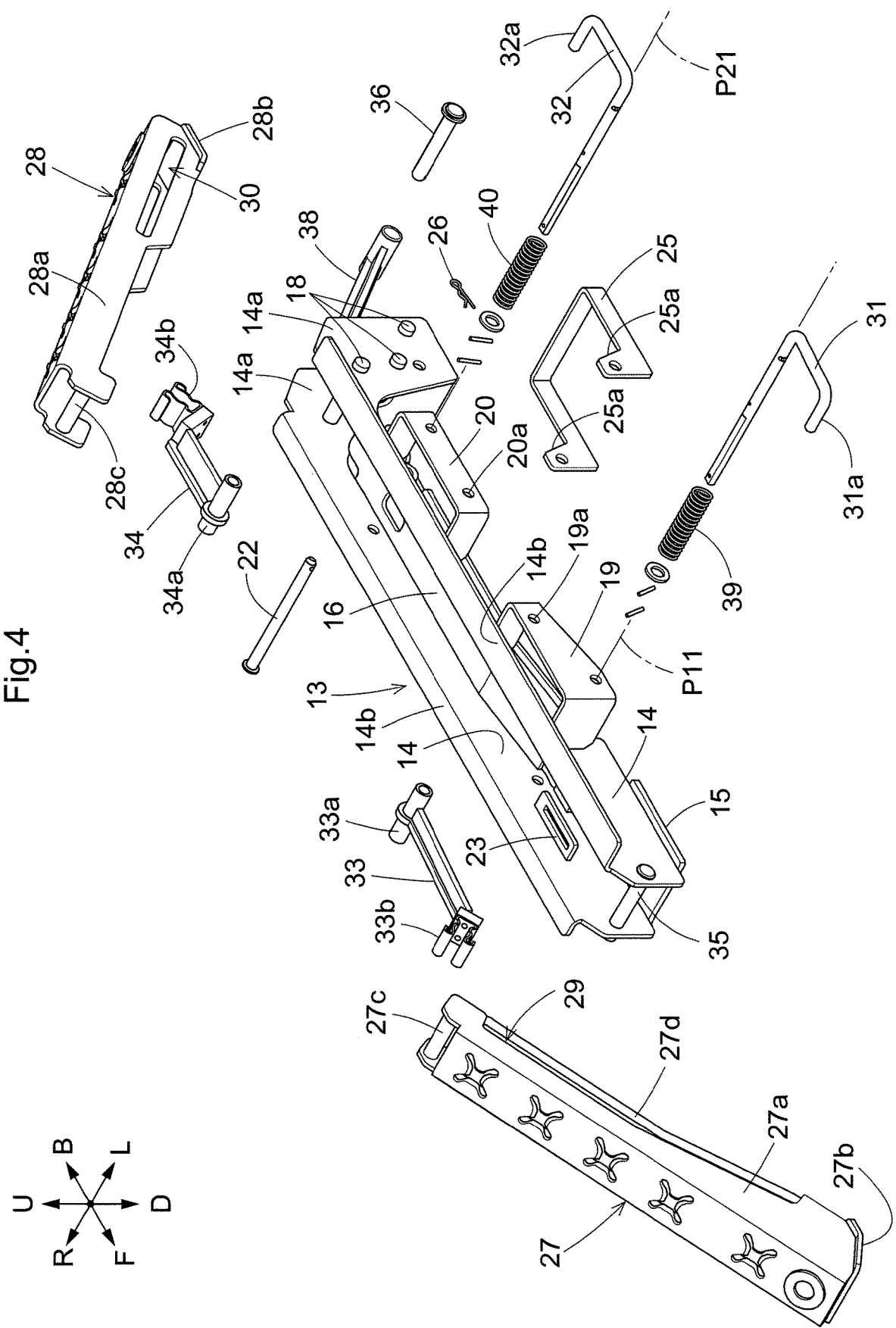
FIG. 4 is an exploded perspective view of members such as a passage portion, front and back slope portions, front and back linking portions, a support linking portion, and front and back operating portions.
Figure 5:
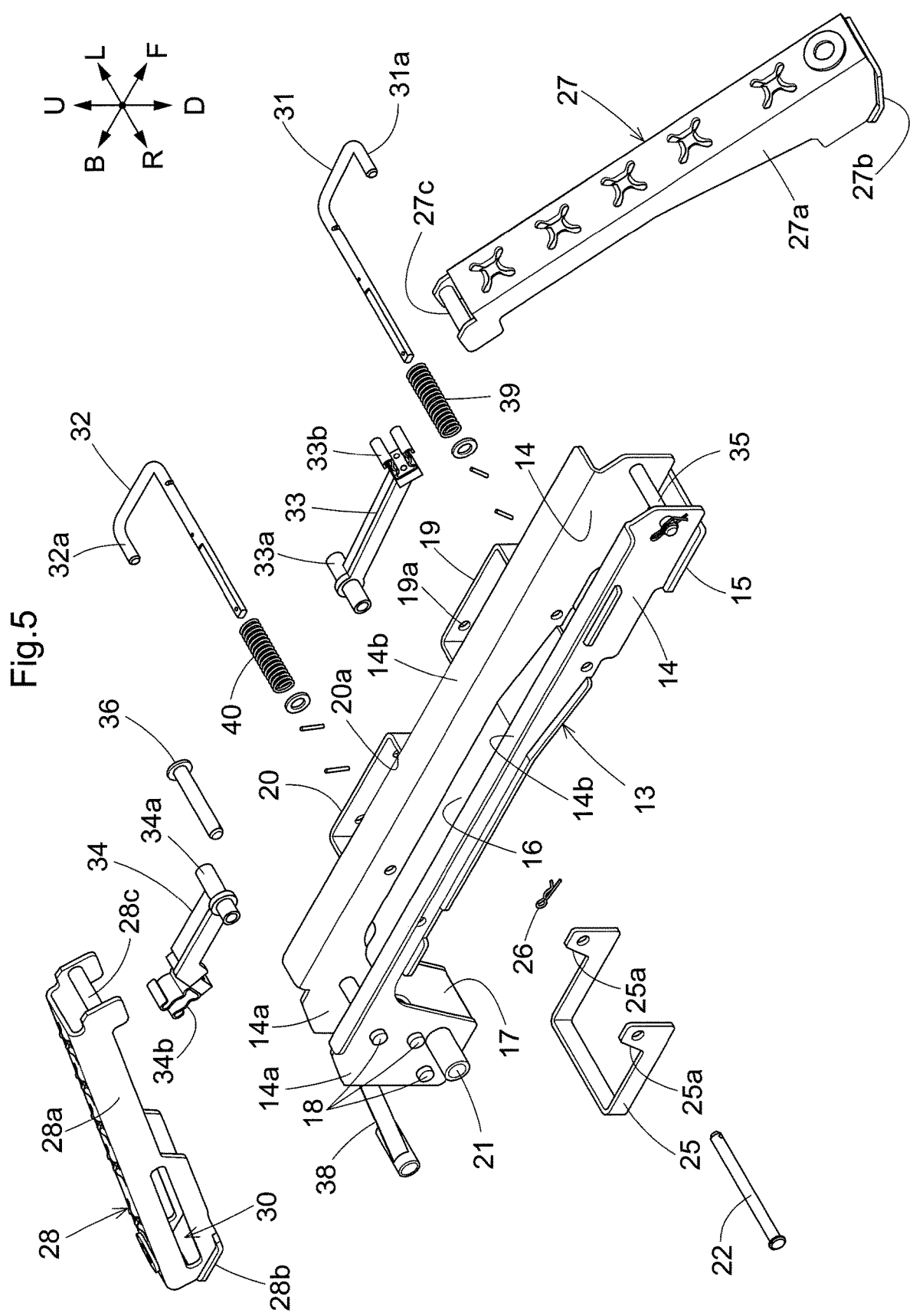
FIG. 5 is an exploded perspective view of members such as a passage portion, front and back slope portions, front and back linking portions, a support linking portion, and front and back operating portions.

As illustrated in FIGS. 2 and 3, at the front use position A13, the front slope portion 27 is supported by the ground via the ground plate 27b of the front slope portion 27 and by the upper surface portion 11 of the mower deck 1 via the front shaft portion 35 and the passage portion 13.

In the case of moving the front slope portion 27 from the front use position A13 to the front storage position A11, the operator holds the front operating portion 31, operates the front operating portion 31 from the front position to an upper back side relative to the axis P11, and operates the front operating portion 31 from the state where the front operating portion 31 stands from the axis P11 to a back position relative to the axis P11.

As a result of this, the front linking portion 33 is swung in a manner reverse to the above from the front position to an upper back side relative to the axis P11 and from the state where the front linking portion 33 stands from the axis P11 to a back position relative to the axis P11, and the front slope portion 27 is moved from the front use position A13 to the front storage position A11.

As described above, as a result of the front linking portion 33 being operated in the front-back direction, the front slope portion 27 is operated, due to the front linking portion 33, the front elongate hole portion 29, and the front shaft portion 35, to the front storage position A11 provided at the passage portion 13 and to the front use position A13 at which the front slope portion 27 extends from a front portion of the passage portion 13 obliquely in a lower front direction, and a front portion (ground plate 27b) of the front slope portion 27 is capable of coming into contact with the ground.

In the state where the front slope portion 27 is at the front storage position A11, the front linking portion 33 is positioned backwardly relative to the axis P11 of the front linking portion 33. In the state where the front slope portion 27 is at the front use position A13, the front linking portion 33 is positioned forwardly relative to the axis P11 of the front linking portion 33. The front linking portion 33 is swung between the back position and the front position relative to the axis P11 of the front linking portion 33 by passing above the axis P11 of the front linking portion 33.

(Movement of Back Slope Portion between Back Storage Position and Back Use Position)

FIGS. 6 and 7 illustrate a state where the back slope portion 28 is at a back storage position A21. In this state, the back slope portion 28 is positioned between the right and left side plates 14 in a plan view, the back linking portion 34 is positioned forwardly relative to the axis P21 of the back linking portion 34, the support linking portion 38 is swung upwardly, and the back shaft portion 36 is positioned at a back end portion of the elongate hole portion 30 of the back slope portion 28.

In the state where the back slope portion 28 is at the back storage position A21, the back operating portion 32 is also positioned forwardly relative to the axis P21 of the back linking portion 34. Keeping an end portion 32a of the back operating portion 32 inserted in an engaging hole 20a (see FIGS. 4 and 5) of the back holding portion 20 causes the back operating portion 32 to be held in such a manner as to be incapable of swinging about the axis P21 and the back slope portion 28 to be held at the back storage position A21.

As illustrated in FIGS. 3, 4, 5, and 7, between the back operating portion 32 and the back holding portion 20, a spring 40 for urging the back operating portion 32 from the back holding portion 20 toward the left side plate 14 is provided. The spring 40 urges the end portion 32a of the back operating portion 32 toward the side from which the end portion 32a enters the engaging hole 20a of the back holding portion 20. The end portion 32a of the back operating portion 32 does not easily come out of the engaging hole 20a of the back holding portion 20.

When an operator holds the back operating portion 32 and pulls the end portion 32a of the back operating portion 32 out of the engaging hole 20a of the back holding portion 20 against the urge of the spring 40, the back operating portion 32 becomes operable.

Figure 10:
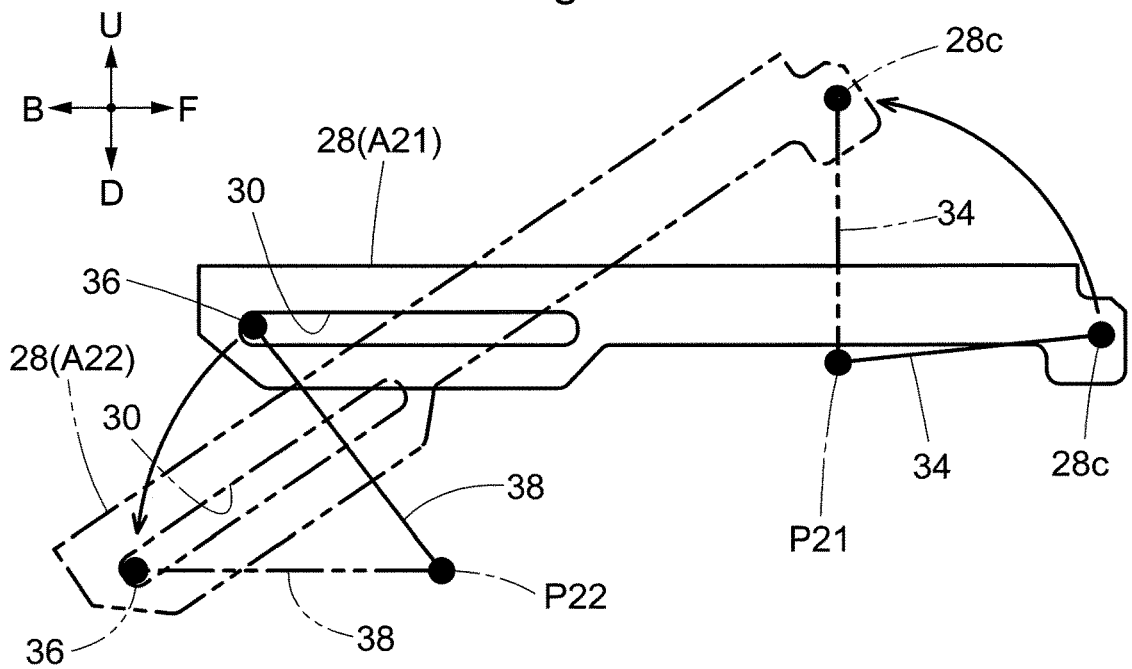
FIG. 10 is a schematic side view illustrating a state where a back slope portion is operated from a back storage position to an intermediate position.

As illustrated in FIG. 10, when the operator operates the back operating portion 32 from a front position to an upper back side relative to the axis P21, the back linking portion 34 is also swung from a front position to an upper back side relative to the axis P21.

Along with this, as a result of the back slope portion 28 being supported by the back elongate hole portion 30 and the back shaft portion 36, the back slope portion 28 is swung in such a manner that a back portion of the back slope portion 28 is lifted by the back linking portion 34 while the back slope portion 28 is moved a little to a back side.

Simultaneously with this, the support linking portion 38 is swung downwardly, the back shaft portion 36 is moved downwardly. The back slope portion 28 becomes inclined with a front portion lifted while being lowered, and when the back linking portion 34 reaches a state where the back linking portion 34 stands from the axis P21, the back slope portion 28 reaches an intermediate position A22, at which the back slope portion 28 has an inclined posture with a front portion lifted.

Figure 11:
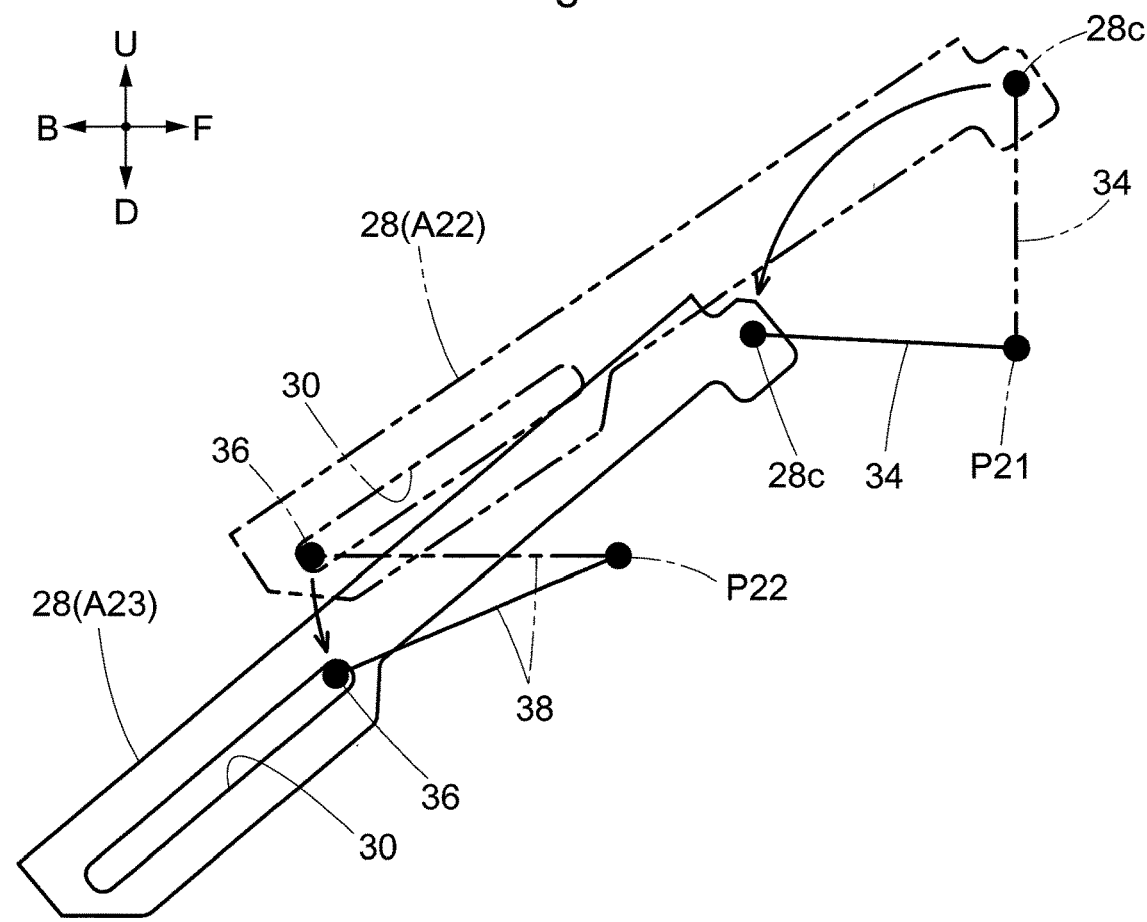
FIG. 11 is a schematic side view illustrating a state where a back slope portion is operated from an intermediate position to a back use position.

As illustrated in FIGS. 10 and 11, when the operator then operates the back operating portion 32 from the state where the back operating portion 32 stands from the axis P21 to a back position relative to the axis P21, the back linking portion 34 is also swung to a back position relative to the axis P21.

As the back linking portion 34 is swung from the state where the back linking portion 34 stands from the axis P21 to a back position relative to the axis P21, the support linking portion 38 is swung further downwardly, and the back slope portion 28 is, as a result of being supported by the back elongate hole portion 30 and the back shaft portion 36, moved obliquely in a lower back direction and reaches a back use position A23 while substantially maintaining its inclined posture with a front portion lifted, and the back shaft portion 36 reaches a front end portion of the back elongate hole portion 30.

As illustrated in FIGS. 2 and 3, at the back use position A23, the back slope portion 28 is supported by the ground via the ground plate 28b of the back slope portion 28 and by the upper surface portion 11 of the mower deck 1 via the uppermost reinforcing member 18 and the passage portion 13.

In the case of moving the back slope portion 28 from the back use position A23 to the back storage position A21, the operator holds the back operating portion 32, operates the back operating portion 32 from the back position to an upper front side relative to the axis P21, and operates the back operating portion 32 from the state where the back operating portion 32 stands from the axis P21 to a front position relative to the axis P21.

As a result of this, the back linking portion 34 is swung in a manner reverse to the above from the back position to an upper front side relative to the axis P21 and from the state where the back linking portion 34 stands from the axis P21 to a front position relative to the axis P21, the support linking portion 38 is swung upwardly simultaneously with the above swing, and the back slope portion 28 is moved from the back use position A23 to the back storage position A21.

As described above, as a result of the back linking portion 34 being operated in the front-back direction, the back slope portion 28 is operated, due to the back linking portion 34, the back elongate hole portion 30, the back shaft portion 36, and the support linking portion 38, to the back storage position A21 at the passage portion 13 and to the back use position A23 at which the back slope portion 28 extends from a back portion of the passage portion 13 obliquely in a lower back direction, and a back portion (ground plate 28b) of the back slope portion 28 is capable of coming into contact with the ground.

In the state where the back slope portion 28 is at the back storage position A21, the back linking portion 34 is positioned forwardly relative to the axis P21 of the back linking portion 34. In the state where the back slope portion 28 is at the back use position A23, the back linking portion 34 is positioned backwardly relative to the axis P21 of the back linking portion 34. The back linking portion 34 is swung between the front position and the back position relative to the axis P21 of the back linking portion 34 by passing above the axis P21 of the back linking portion 34.

FIRST OTHER EMBODIMENT OF INVENTION

For the back slope portion 28, the support linking portion 38 may be replaced with the back linking portion 34. With this configuration, the back slope portion 28 and the back linking portion 34 are similar in configuration to the front slope portion 27 and the front linking portion 33.

SECOND OTHER EMBODIMENT OF INVENTION

For the front slope portion 27, a support linking portion 38 may be provided to face forward so that the front shaft portion 35 is supported by the support linking portion 38. With this configuration, the front slope portion 27, the front linking portion 33, and the support linking portion 38 are similar in configuration to the back slope portion 28, the back linking portion 34, and the support linking portion 38.

THIRD OTHER EMBODIMENT OF INVENTION

The axis P11 of the front operating portion 31 and the front linking portion 33 may be coaxial with the axis P21 of the back operating portion 32 and the back linking portion 34.

INDUSTRIAL APPLICABILITY

The present invention is applicable not only to a mower including three cutting blades 2 but also to a mower including two cutting blades 2 and a mower including four cutting blades 2.

REFERENCE SIGNS LIST

1 Mower deck
11 Upper surface portion of mower deck
13 Passage portion
14 Side plate
19 Front holding portion
20 Back holding portion 22 Attaching pin (attaching portion)
23 Attaching plate (attaching portion)
24 Engaging portion (attaching portion)
25 Connecting portion (attaching portion)
27 Front slope portion
28 Back slope portion
29 Front elongate hole portion (front supporting portion)
30 Back elongate hole portion (back supporting portion)
31 Front operating portion
32 Back operating portion
33 Front linking portion
34 Back linking portion
35 Front shaft portion (front supporting portion)
36 Back shaft portion (back supporting portion)
38 Support linking portion
A11 Front storage position
A13 Front use position
A21 Back storage position
A23 Back use position
P11 Axis
P21 Axis
P22 Axis

The invention claimed is:

1. A mower, comprising:
a passage portion provided at each of a right portion and a left portion of an upper surface portion of a mower deck and oriented in a front-back direction on which passage portion a wheel of a work vehicle passes;
a front slope portion provided at a front portion of the passage portion;
a back slope portion provided at a back portion of the passage portion;
a front supporting portion supporting the front slope portion in such a manner as to allow the front slope portion to move in the front-back direction and swing in an up-down direction;
a back supporting portion supporting the back slope portion in such a manner as to allow the back slope portion to move in the front-back direction and swing in the up-down direction;
a front linking portion that is supported in such a manner as to swing in the front-back direction about an axis extending in a left-right direction and that is connected with the front slope portion; and
a back linking portion that is supported in such a manner as to swing in the front-back direction about an axis extending in the left-right direction and that is connected with the back slope portion,
wherein:
one of the front supporting portion of the front slope portion and the back supporting portion of the back slope portion comprises:
 a first elongate hole portion which extends in the front-back direction and is present in the front or back slope portion corresponding to said one of the front supporting portion and the back supporting portion, and
 a first shaft portion present through the first elongate hole portion in the left-right direction and attached to the passage portion,
as a result of the front linking portion being operated in the front-back direction, the front slope portion is operated, due to the front linking portion and the front supporting portion, to a front storage position provided at the passage portion and to a front use position at which the front slope portion extends from the front portion of the passage portion obliquely in a lower front direction such that a front portion of the front slope portion is capable of coming into contact with ground,
as a result of the back linking portion being operated in the front-back direction, the back slope portion is operated, due to the back linking portion and the back supporting portion, to a back storage position provided at the passage portion and to a back use position at which the back slope portion extends from the back portion of the passage portion obliquely in a lower back direction such that a back portion of the back slope portion is capable of coming into contact with the ground, and
in the front or back storage position corresponding to said one of the front supporting portion and the back supporting portion, the first shaft portion is at a first end portion of the first elongate hole portion, and in the front or back use position corresponding to said one of the front supporting portion and the back supporting portion, the first shaft portion is at a second end portion of the first elongate hole portion, the second end portion being on an opposite side to the first end portion.

2. The mower according to claim 1, wherein:
the front linking portion is connected with a back portion of the front slope portion,
in a state where the front slope portion is at the front storage position, the front linking portion is positioned backwardly relative to the axis of the front linking portion,
in a state where the front slope portion is at the front use position, the front linking portion is positioned forwardly relative to the axis of the front linking portion,
the front linking portion swings above and past the axis of the front linking portion, and
the back linking portion is connected with a front portion of the back slope portion, in a state where the back slope portion is at the back storage position, the back linking portion is positioned forwardly relative to the axis of the back linking portion, in a state where the back slope portion is at the back use position, the back linking portion is positioned backwardly relative to the axis of the back linking portion, and the back linking portion swings above and past the axis of the back linking portion.

3. The mower according to claim 2, wherein:
the other of the front supporting portion of the front slope portion and the back supporting portion of the back slope portion comprises:
 a second elongate hole portion which extends in the front-back direction and is present in the front or back slope portion corresponding to said the other of the front supporting portion and the back supporting portion, and
 a second shaft portion present through the second elongate hole portion in the left-right direction and attached to the passage portion,
wherein in the front or back storage position corresponding to said the other of the front supporting portion and the back supporting portion, the second shaft portion is at a first end portion of the second elongate hole portion, and in the front or back use position corresponding to said the other of the front supporting portion and the back supporting portion, the second shaft portion is at a second end portion of the second elongate hole portion, the second end portion being on an opposite side to the first end portion.

4. The mower according to claim 3, wherein:

the back shaft portion is supported by a support linking portion configured to swing in the up-down direction about an axis extending in the left-right direction, and in the state where the back slope portion is at the back storage position, operating the back linking portion backwardly causes the support linking portion to swing downwardly and the back shaft portion to move downwardly.

5. The mower according to claim 1, further comprising:

a front operating portion connected with the front linking portion for manual operation of the front linking portion; and a back operating portion connected with the back linking portion for manual operation of the back linking portion.

6. The mower according to claim 5, further comprising:

a front holding portion configured to hold the front operating portion in a state where the front slope portion is at the front storage position; and a back holding portion configured to hold the back operating portion in a state where the back slope portion is at the back storage position.

7. The mower according to claim 1, wherein:

the passage portion includes a right side plate and a left side plate that are oriented in the front-back direction, the front linking portion and the back linking portion are positioned between the right side plate and the left side plate in a plan view, and the front linking portion and the back linking portion are positioned between the right side plate and the left side plate in the plan view in a state where the front slope portion is at the front storage position, and the back slope portion is at the back storage position.

8. The mower according to claim 1, wherein:

the front supporting portion, the back supporting portion, the front linking portion, and the back linking portion are provided at the passage portion, and the mower further comprises an attaching portion configured to attach the passage portion to and detach the passage portion from the mower deck.

* * * * *